(12) United States Patent
Ficara et al.

(10) Patent No.: US 9,705,700 B2
(45) Date of Patent: Jul. 11, 2017

(54) SPARSE GRAPH CODING SCHEDULING FOR DETERMINISTIC ETHERNET

(71) Applicant: Cisco Technology, Inc., San Jose, CA (US)

(72) Inventors: Domenico Ficara, Essertines-sur-Yverdon (CH); Davide Cuda, Morges (CH); Leo Caldarola, Morrens (CH); Salvatore Valenza, Pomy (CH); Roberto Muccifora, Ropraz (CH)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 14/519,714

(22) Filed: Oct. 21, 2014

(65) Prior Publication Data

US 2016/0112308 A1 Apr. 21, 2016

(51) Int. Cl.
*H04L 12/28* (2006.01)
*H04L 12/417* (2006.01)
*H04L 12/875* (2013.01)

(52) U.S. Cl.
CPC ............ *H04L 12/417* (2013.01); *H04L 47/56* (2013.01)

(58) Field of Classification Search
CPC ....... H04L 12/417; H04L 45/12; H04L 45/22; H04L 45/42; H04L 12/403; H04L 12/4616; H04L 1/0071; H04L 2012/4026; H04L 29/08882; H03M 13/1111; H03M 13/1102; H03M 13/13
USPC .................. 370/401, 406, 400, 336; 398/43; 714/784
IPC .......................................... H04L 12/417,47/56
See application file for complete search history.

(56) References Cited

U.S. PATENT DOCUMENTS

2008/0279155 A1* 11/2008 Pratt, Jr. ................. H04L 12/66 370/336
2009/0046732 A1* 2/2009 Pratt, Jr. ................. H04L 12/66 370/406
2009/0129395 A1* 5/2009 Janssen ................. H04L 12/403 370/400

(Continued)

FOREIGN PATENT DOCUMENTS

DE WO 2011088956 A1 * 7/2011 ......... H04L 12/4645

OTHER PUBLICATIONS

EtherCAT Ethernet Control Automation Technology Technical Introduction and Overview Dec. 2004.*

*Primary Examiner* — Shaq Taha
*Assistant Examiner* — Lionel Preval
(74) *Attorney, Agent, or Firm* — Patterson + Sheridan LLP

(57) ABSTRACT

Embodiments provide techniques for transmitting data packets across a deterministic Ethernet network. Embodiments receive, at a first device in the deterministic Ethernet network, a deterministic binary schedule specifying timing information for transmitting data fragments relating to a plurality of data flows. Data packets to transmit to a destination device within the deterministic Ethernet network are received at the first device. Embodiments include fragmenting each of the data packets into two or more fragments and encoding at least one of the two or more fragments for each of the data packets with a respective sparse graph code. The encoded fragments are transmitted to the destination device, across multiple paths through the deterministic Ethernet network, according to timing information specified in the deterministic binary schedule.

18 Claims, 5 Drawing Sheets

(56) References Cited

U.S. PATENT DOCUMENTS

2012/0087656 A1* 4/2012 Rourke ............... H04L 12/4616
398/43
2012/0151303 A1* 6/2012 Sayadi ................. H04L 1/0071
714/784

* cited by examiner

SPARSE GRAPH CODING SCHEDULING FOR DETERMINISTIC ETHERNET

TECHNICAL FIELD

Embodiments presented in this disclosure generally relate to computer networking, and more specifically to techniques for computing a substantially jitter-free transmission schedule in a deterministic Ethernet network.

BACKGROUND

Data communication in a computer network involves the exchange of data between two or more entities interconnected by communication links and subnetworks. A local area network (LAN) is an example of a subnetwork that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and subnetworks, whereas an end station may be a computer located on one of the subnetworks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

One disadvantage of traditional Ethernet communications is that the arbitration between competing nodes that wish to transmit on the shared network at a given moment in time is inherently non-deterministic. That is, since only one node can transmit across a medium at a moment in time, a node's transmissions across a particular medium may be delayed in the event that another node is currently transmitting on the particular medium. Moreover, in the event that two nodes transmit at the same time, the nodes may sense a collision and retransmitting their data after some length of time. Furthermore, in the event that multiple network devices are joined using a network switch, additional sources of delay can be introduced as the switch buffers messages to a particular destination that would otherwise result in a collision. Such buffering introduces further delay that varies based on the network load.

In order to address such concerns, each node within the network can be configured with a respective synchronized clock for use in coordinating the transmission of data packets across the nodes. The general use of such synchronized clocks can overcome some problems of coordinating control actions between separated components in the deterministic Ethernet network. For example, a time stamp could be inserted into I/O messages and the messages, upon arriving at their destination, could be re-ordered in chronological order based on the inserted time stamps. As another example, time stamps could be included within output messages and, upon arriving at their destination, the output messages could be executed in chronological order based on the included time stamps, thereby making the output messages somewhat indifferent to network delay. However, large variation in network delay associated with non-deterministic networks such as Ethernet networks can prevent accurate clock synchronization across the various nodes on the network and may lead to other disadvantages such as increased jitter.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
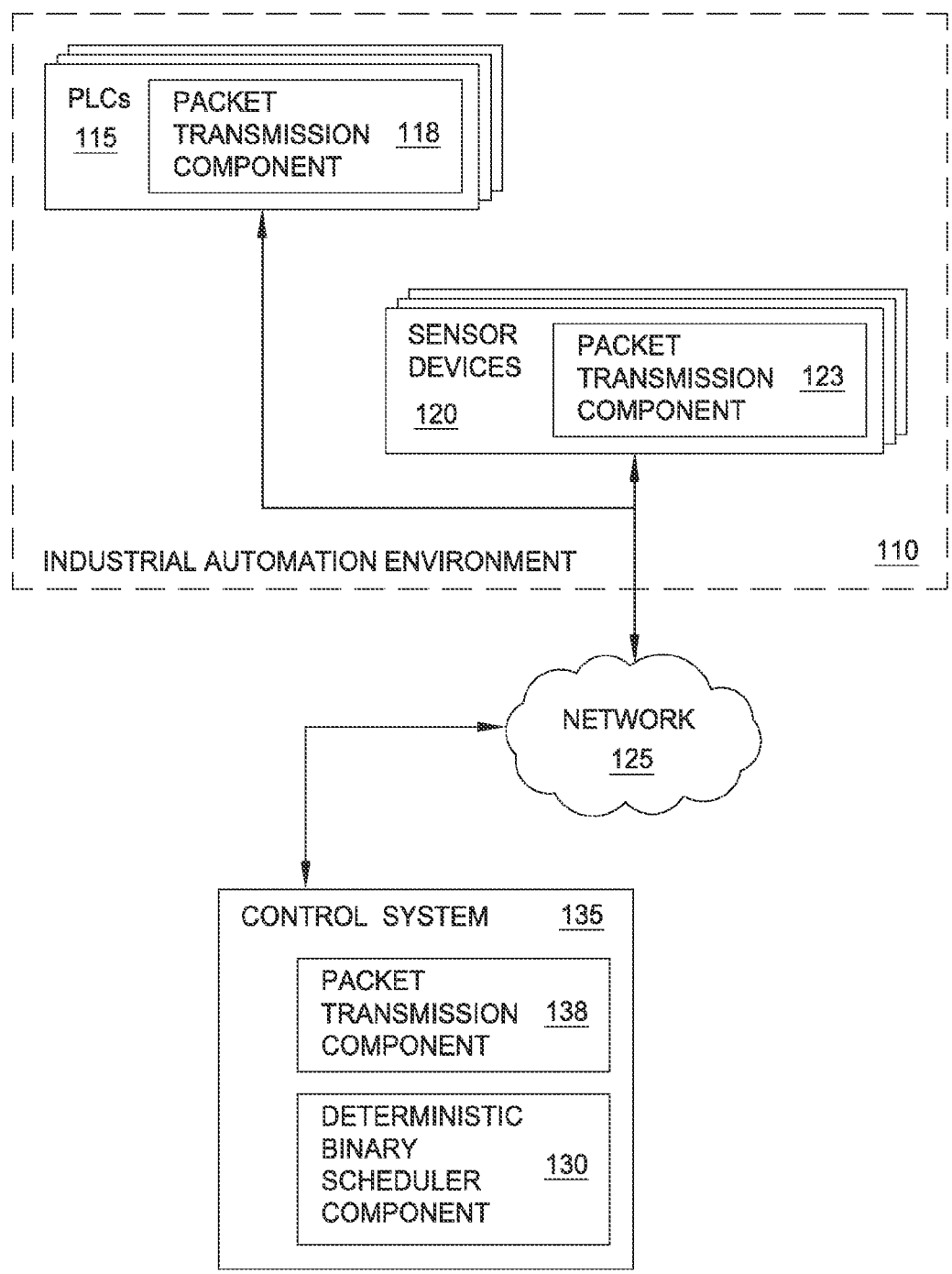
FIG. 1 illustrates a system that includes a deterministic binary scheduler component for a deterministic Ethernet network, according to one embodiment described herein.

One embodiment provides a method for synchronizing forwarding tables across forwarding pipelines. The method includes receiving, at a first device in the deterministic Ethernet network, a deterministic binary schedule specifying timing information for transmitting data fragments relating to a plurality of data flows. According to the method, data packets to transmit to a destination device within the deterministic Ethernet network are received at the first device. The method further includes fragmenting each of the data packets into two or more fragments and encoding at least one of the two or more fragments for each of the data packets with a respective sparse graph code. The encoded fragments are transmitted to the destination device, across multiple paths through the deterministic Ethernet network, according to timing information specified in the deterministic binary schedule.

Particular other embodiments provide a network device and a non-transitory computer-readable medium for carrying out the aforementioned method.

Example Embodiments

Deterministic Ethernet is continuing to gain attention as a way to adapt the widely used Ethernet technology for time-critical and time-sensitive tasks, such as those in industrial automation environments such as factory plants and vehicles. Generally, deterministic Ethernet networks provide packet loss-free communications as well as deterministic, reduced jitter for data packets using relatively ubiquitous and inexpensive hardware. This can be accomplished, for instance, through ad-hoc scheduling of data streams. Such schedules are typically generated off-line and may impose some constraints on the data streams. However, as a general matter, such networks are well-suited for time-sensitive network traffic.

Typically, deterministic Ethernet applications are intrinsically jitter sensitive. For example, an industrial automation environment may include sensors and programmable logic controllers (PLCs) that rely on receiving data at a predefined point in time. As such, even a relatively small amount of jitter may negatively impact the performance of these devices. However, because Ethernet networks are not intrinsically deterministic communication networks, it is very difficult to schedule the communications of multiple data flows without introducing complications such as jitter, particularly when using data packet fragmentation and multiple path forwarding.

As such, embodiments provide techniques for transmitting data packets in a deterministic Ethernet network with an optimal minimum amount of jitter. Embodiments include receiving a deterministic binary schedule specifying timing information for transmitting data fragments relating to a plurality of data flows. For example, the deterministic binary schedule could be generated offline and could specify timing information for when various data packets and/or fragments of data packets are to be transmitted for each data flow within the network. The deterministic binary schedule could then be loaded onto each device within the deterministic Ethernet network to facilitate communications between the devices.

Embodiments may receive data packets for each of the plurality of data flows to transmit to a destination device within the deterministic Ethernet network. Upon receiving the data packets, embodiments may fragment each data packet into two or more fragments. For example, each data packet could be divided in half to produce two data fragments. More generally, however, any suitable technique for fragmenting the data packets to produce two or more data fragments can be used, consistent with the present disclosure.

Logic on the first device can also encode at least one of the two or more fragments for each of the data packets with a respective sparse graph code. Examples of sparse graph codes include various forms of error-correcting codes such as low-density parity-check codes. Generally, any suitable form of encoding can be used, consistent with the present disclosure. Such encoding allows for transmitted data values (e.g., data packets or fragments) to be recovered, in the event of packet/fragment loss during the transmission process, thus substantially eliminating any packet loss for the data transmissions across the deterministic Ethernet network.

The encoded fragments can then be transmitted to the destination device, across multiple paths through the deterministic Ethernet network, according to timing information specified in the deterministic binary schedule. Generally, the deterministic binary schedule is used to determine timing information for transmitting the fragments across the network. For example, each device within the network can maintain a respective clock that is synchronized with all the clocks on the other devices within the network. The device could then access the deterministic binary schedule to determine a time at which to transmit the fragments, based on timing information within the deterministic binary schedule specifying an allotted time for transmitting each fragment for each of the data flows. Doing so prevents temporal collisions between the data packets and eliminates jitter for the transmitted data packets. Moreover, by transmitting the fragments using multiple different paths through the deterministic Ethernet network, embodiments increase the chance that at least one of the fragments will reach the destination device, thus reducing packet/fragment loss at the cost of a minimal traffic bandwidth increase for the network.

FIG. 1 illustrates a system that includes a deterministic binary scheduler component for a deterministic Ethernet network, according to one embodiment described herein. As shown, the system 100 includes an industrial automation environment 110 communicatively connected to a control system 135 via a network 125. Generally, the network 125 represents a deterministic Ethernet network. The industrial automation environment 110 includes a plurality of PLCs 115, each configured with a respective packet transmission component 118, and a plurality of sensor devices 120, each configured with a respective packet transmission component 123. Generally, while the industrial automation environment 110 illustrates one example of an environment in which embodiments can be employed, such an example is provided for illustrative purposes only and without limitation.

The control system in turn is configured with a packet transmission component 138 and a deterministic binary scheduler component 130. The deterministic binary scheduler component 130 is configured to generate a deterministic binary schedule for use by the devices on the deterministic Ethernet network (i.e., PLCs 115, sensor devices 120 and control system 135 in the system 100). Generally, in a pure time-slot scheduling system, due to the discrete nature of the time slots, there will typically be some minimum amount of jitter due to conflicts between data flows over a single time slot.

For example, assume that Data Flow A has a period of 4 while a Data Flow B has a period of 3, meaning that Data Flow A is configured to transmit a data packet every 4 units of time and Data Flow B is configured to transmit a data packet every 3 units of time. An example of such an arrangement can be seen in Table 1:

TABLE 1

Collision Case for Periodic Flows

| | Time | | | | | | | | |
|---|---|---|---|---|---|---|---|---|---|
| | 0 | 1 | 2 | 3 | 4 | 5 | 6 | 7 | 8 |
| Data Flow A | A | | | | A | | | | A |
| Data Flow B | | | B | | | B | | | B |

As can be seen from Table 1, although the Data Flows A and B each have different periods, a conflict still arises between the data flows at time 8, where both data flows are scheduled to transmit a data packet during this time slot. However, due to the nature of the deterministic Ethernet network, only a single data flow can transmit during a given time slot and so either the data packet for either Data Flow A or Data Flow B must be moved to a neighboring time slot (e.g., time slot 7 or time slot 9), thereby causing jitter for the data flow whose packet is moved. For example, a schedule could be generated in which the packet for Data Flow B is moved to an earlier time slot, as shown in Table 2:

TABLE 2

Schedule for Flows Introducing Jitter for Data Flow B

| | Time | | | | | | | | |
|---|---|---|---|---|---|---|---|---|---|
| | 0 | 1 | 2 | 3 | 4 | 5 | 6 | 7 | 8 |
| Schedule | A | | B | | A | B | | B | A |

As shown in Table 2, while Data Flow A has been assigned the time slot 8 consistent with the period for Data Flow A, Data Flow B has been moved to adjacent time slot 7. Thus, because Data Flow B is expected to transmit at time slot 8 (i.e., due to the period of 3 for Data Flow B and as shown in Table 1), the packet for Data Flow B will instead be transmitted at time slot 7, thus introducing jitter into the data communications. As many applications that rely on deterministic Ethernet networks are very sensitive to jitter, such a schedule algorithm may be undesirable for these applications.

As such, the deterministic binary scheduler component 130 could generate a schedule that eliminates jitter for fragmented network traffic. For example, in an embodiment where the packet transmission components 118, 123 and 138 are configured to fragment each data packet into two distinct fragments, the deterministic binary scheduler component 130 could generate the schedule shown in Table 3:

recover the information with the aid of another linear combination of the two fragments.

As shown in Table 3, the deterministic binary scheduler component 130 has generated a schedule that introduces no jitter for either Data Flow A or Data Flow B, as all the fragments for all of the data packets for both data flows are received by time slot 8 (i.e., the time slot where the initial conflict occurred, as shown in Table 1). For example, at time slot 2, when packet $B_1$ is expected, the destination device has received all fragments for packet $B_1$ and can reassemble the data fragments to produce the data packet $B_1$. As another example, when packet $A_1$ is expected at time slot 4, the destination device has received all fragments for data packet $A_1$, either directly or as a function of other fragments. And at time slot 8, when the data packets $B_3$ and $A_2$ are expected to arrive, the destination device has received all elements needed to compute $A_2$ and $B_3$. For instance, the destination device could reassemble data packet $B_3$ using the fragments $B_3^2$ and $B_3^1$ received at time slots 7.5 and 8, respectively.

As mentioned above, the packet transmission components (e.g., packet transmission component 138) can fragment the data packets into the number of fragments specified by the transmission schedule (e.g., two fragments per data packet, in the above example) and can encode the fragments using sparse graph coding. Doing so can enable the destination device to reassemble certain data fragments, in the event the data fragments have not yet arrived or have been lost in transmission. This, in turn, helps to reduce any packet loss in the network 125.

Of note, the deterministic binary scheduler component 130 can also generate the schedule to include some level of additional redundancy. For example, in the schedule shown above in Table 3, the deterministic binary scheduler component has scheduled the fragment $B_1^1$ to be transmitted at both time slots 1 and 4. While doing so consumes a relatively insignificant amount of additional network bandwidth, such redundancy in the transmission of data fragments helps to reduce the potential for packet loss in the deterministic Ethernet network. Moreover, by encoding pre-

TABLE 3

Jitter-free Fragment Schedule

| | Time | | | | | | | | | | | | | | | |
|---|---|---|---|---|---|---|---|---|---|---|---|---|---|---|---|---|
| | 0.5 | 1 | 1.5 | 2 | 2.5 | 3 | 3.5 | 4 | 4.5 | 5 | 5.5 | 6 | 6.5 | 7 | 7.5 | 8 |
| Schedule | $A_1^1$ | $B_1^1$ | | $B_1^2$ | | | | $A_1^2 + B_1^1$ | $B_2^1$ | $B_2^2$ | | | $A_2^1$ | $B_3^1$ | $A_2^2 + B_3^2$ | $A_2^2 + B_3^1$ |

Again, assume that the Data Flows A and B have a period of 4 and 3, respectively. Here, the notation $Y_k^j$ indicates the j-th fragment of the k-th packet of Data Flow Y. Moreover, the notation of $Y_k^j + Z_m^l$ indicates that two fragments from data packets $Y_k$ and $Z_m$, respectively, have been combined into a single data unit using a sparse graph encoding. That is, the deterministic binary scheduler component 130 could generate the schedule such that a lightweight linear priority check code (LDPC) or Repeat Accumulate Code (RAC) is generated for the union of the fragments for all conflicting flows, and could transmit the fragmented flows together with additional fragments that provide the checksum (e.g., check nodes for LDPC) of a subset of fragments. In joining the fragments, the deterministic binary scheduler component 130 could combine the fragments through a linear operation such as exclusive OR (XOR), such that the receiver can viously transmitted fragments such as the fragment $B_1^1$ with other new fragments, such as in time slot 4 in Table 3, the deterministic binary scheduler component 130 can allow reassembly performed by the destination device, as the included past fragment (e.g., fragment $B_1^1$) provides a linear condition on fragments that are still unknown and have yet to come. That is, reassembly of the data packet is made possible by the presence of different linear combinations of the same fragments. Thus, as long as the deterministic binary scheduler component 130 receives a requisite N number of fragments for a given data packet, the deterministic binary scheduler component 130 can reconstruct the data packet even if the remaining fragments are not received (or are received but at a later time) and regardless of which fragments for the data packet constitute the N fragments. Generally, the number of fragments required to reconstruct a data packet depends on the sparse graph coding technique used.

Additionally, while the above example shows a schedule generated by the deterministic binary scheduler component 130 in an environment having two data flows, embodiments may be applied to environments supporting any number of distinct data flows. Thus, while the above example combines the fragments from data packets of flows A and B and computes a sparse graph code (e.g., LDPC) for the union of the fragments, such techniques could further be extended to additional flows as well. For example, if the union of the fragments from flows A and B is viewed as a flow X which is a function of flows A and B (e.g., X=F(A, B)), then similar techniques could be repeated to incorporated an additional flow C into flow X. This can then be repeated recursively to account for any number of additional data flows within the network 125.

As discussed above, the packet transmission components can be configured to fragment data flows based on the generated schedule. The packet transmission components could then encode the fragments (or the unions of multiple fragments) with a sparse graph code and can transmit the encoded fragments at the time slots specified by the schedule. For example, the packet transmission component 138 on control system 135 could receive data packets from each of two or more data flows to transmit to one of PLCs 115, and the packet transmission component 138 could fragment each of the data packets as specified by the schedule. The packet transmission component 138 could then encode the fragments and could transmit the fragments across the network 125 to the PLC 115. Upon receiving the fragments, the packet transmission component 118 could reassemble the fragments to recreate the data packets and could compute any lost or delayed fragments using the sparse graph codes encoded within the received packets. Doing so provides jitter-free communications across for the deterministic Ethernet network.

Figure 2:
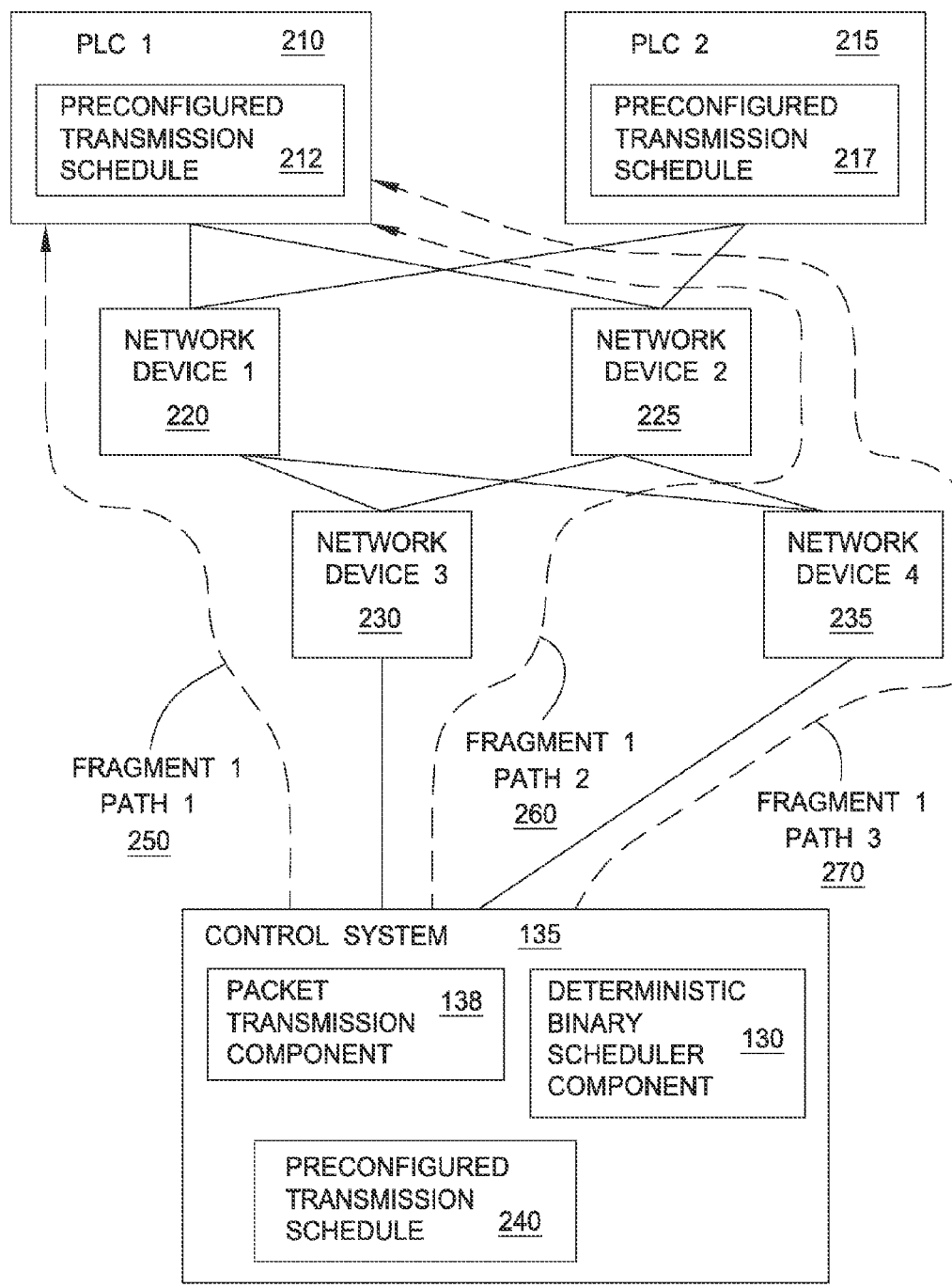
FIG. 2 illustrates multiple paths for a fragment of a data packet through a deterministic Ethernet network, according to one embodiment described herein.

In one embodiment, the packet transmission component 138 is configured to transmit the data fragments to the destination device (e.g., one of PLCs 115, in the above example) using multiple paths through the network 125, in order to increase the redundancy of the communication. An example of this is shown in FIG. 2, which illustrates multiple paths for a fragment of a data packet through a deterministic Ethernet network, according to one embodiment described herein. As shown, the network 200 includes PLCs 210 and 215, network devices 220, 225 230 and 235, and a control system 135. As discussed above, the deterministic binary scheduler component 130 can generate a transmission schedule for use by the devices on the network 200. As shown, PLC 210 is shown as storing an instance of the preconfigured transmission schedule 212, PLC 215 stores a second instance of preconfigured transmission schedule 217 and control system 135 stores yet another instance of the schedule 240. As discussed above, the deterministic binary scheduler component 130 can be configured to generate the schedule offline and to configure each device within the network with a copy of the generated schedule for use in transmitting and reassembling data fragments.

As shown, the packet transmission component 138 on control system 135 is transmitting a fragment of a data packet for one of the data flows across multiple paths through the network. These paths are represented in FIG. 2 by arrows 250, 260 and 270. By broadcasting the fragment across multiple paths through the network, the packet transmission component 138 provides additional redundancy for the data communications between the control system 135 and the PLC 210. That is, even if the data fragments for paths 250 and 260 are delayed due to an issue involving network device 230, the PLC 210 may still receive the data fragment according to the schedule from the path 270. As many deterministic Ethernet network applications are particularly sensitive to packet loss and delay, the additional level of redundancy provided by the multiple paths 250, 260 and 270 is beneficial.

In one embodiment, the packet transmission component 138 is configured to determine an optimal number of paths on which to transmit the data fragments. For example, the packet transmission component 138 could determine the optimal number of multiple paths on which the encoded fragments are to be transmitted, based on an estimated data loss rate for the deterministic Ethernet network. For example, the packet transmission component 138 could scale the number of paths used with the estimated rate of loss, such that transmissions across a more lossy network will use a greater number of paths and transmissions across a less lossy network will user fewer paths.

Additionally, the packet transmission component 138 could determine the optimal number of multiple paths based on an estimated time savings value corresponding to transmitting the encoded fragments across an additional path through the deterministic Ethernet network. For instance, the packet transmission component 138 could consider the amount of time savings that can be incurred by the destination device in reconstructing the data packets arriving across multiple paths. Moreover, the packet transmission component 138 could determine the optimal number of paths further based on an estimated amount of increased bandwidth consumed from transmitting the encoded fragments across an additional path through the deterministic Ethernet network. For instance, the packet transmission component 138 could weigh such an increase in bandwidth against the benefits of additional time savings and lossiness of the network to determine the optimal number of paths on which to transmit the fragments.

Of note, while the depicted embodiment illustrates the transmission schedules and logic (e.g., packet transmission component 138, the deterministic binary scheduler component 130, etc.) residing on end-point devices within the system, such entities can also reside on the network devices within the network (e.g., 220, 225, 230 and 235). Generally speaking, embodiments may be configured such that endpoints and network devices (e.g., network switches) can all perform the fragmentation and linear combinations of fragments. However, because of CPU, memory and network resources, in one embodiment the network switches are configured to exclusively perform the linear combination operations on the data fragments.

Figure 3:
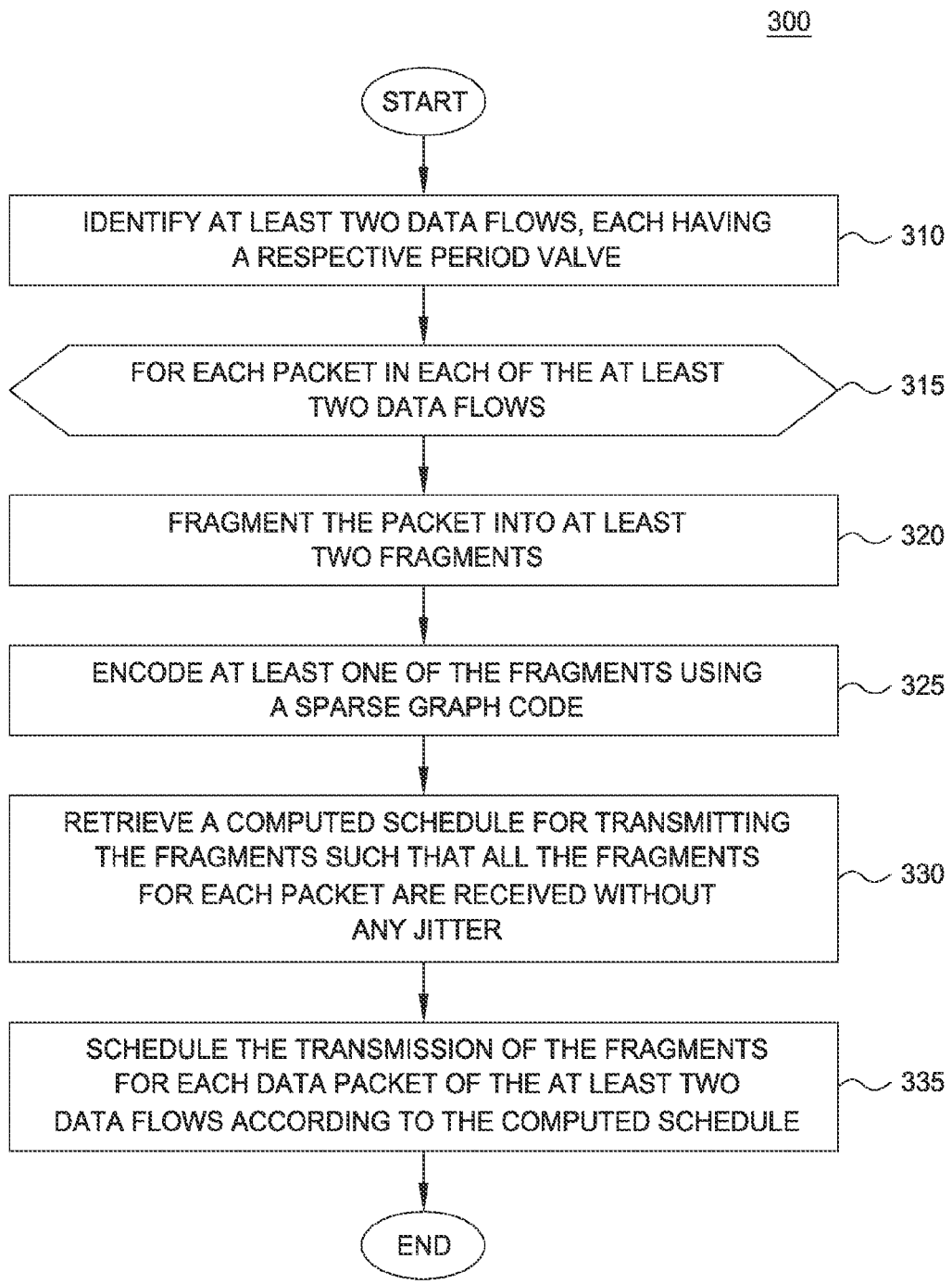
FIG. 3 is a block diagram illustrating a method for transmitting fragmented data packets across a deterministic Ethernet network, according to one embodiment described herein.

FIG. 3 is a block diagram illustrating a method for transmitting fragmented data packets across a deterministic Ethernet network, according to one embodiment described herein. As shown, the method 300 begins at block 310, where the packet transmission component 138 identifies at least two data flows each having a respective period value. Generally the period value for each of the data flows specifies the interval in units of time at which the data flow is scheduled to transmit data values on the deterministic Ethernet network. At block 315, the method 300 enters a loop where blocks 320 and 325 are performed for each packet in each of the at least two data flows. That is, the packet transmission component 138 fragments the packet into at least two fragments (block 320). For example, in the transmission schedule shown in Table 3 and discussed above, the packet transmission component 138 is configured to divide each packet into two fragments. More generally, however, any suitable number of fragments can be used, consistent with the present disclosure.

Additionally, the packet transmission component 138 encodes at least one of the fragments (or a combination of fragments) using a sparse graph code (block 325). Generally, any suitable form of sparse graph coding can be used. Examples of such sparse graph coding schemes include LDPC and Repeat Accumulate Codes. Doing so enables the destination device to recover lost or delayed packets, thereby helping to eliminate the possibility of packet loss from the deterministic Ethernet network. The blocks 320 and 325 are repeated for each of the data packets of the flows.

The packet transmission component 138 then retrieves the pre-computed schedule for transmitting the fragments in such a way that all the fragments for each packet are received at the destination device without any jitter (block 330). For example, the schedule could be generated by the deterministic binary scheduler component 130 and the deterministic binary scheduler component 130 could pre-configure every device within the deterministic Ethernet network with an instance of the generated schedule. In one embodiment, the deterministic binary scheduler component 130 generates the schedule to specify that particular fragments are transmitted multiple times across different time slots. Generally, such redundancy helps to reduce the possibility that the destination device has not received the fragments by the scheduled arrival time. For instance, the deterministic binary scheduler component 130 could randomly or pseudo-randomly select particular fragments to be transmitted multiple times when generating the transmission schedule.

For example, the packet transmission component 138 could combine two or more fragments (e.g., using a union operation), when the schedule specifies that the two or more fragments are to be transmitted together within a single time slot, and could generate a LDPC or Repeat Accumulate Code for the union of the fragments of all conflicting data flows. Moreover, the packet transmission component 138 could transmit the fragmented flows together with additional fragments that provide checksum information (e.g., check nodes for LDPC) of a subset of the fragments. Upon retrieving the schedule, the packet transmission component 138 schedules the transmission of the fragments (and any additional fragments containing checksum information, if applicable) and transmits each of the fragments across the deterministic Ethernet network at their allotted time according to the transmission schedule (block 335), and the method 300 ends. Doing so provides a substantially jitter-free deterministic Ethernet network.

Figure 4:
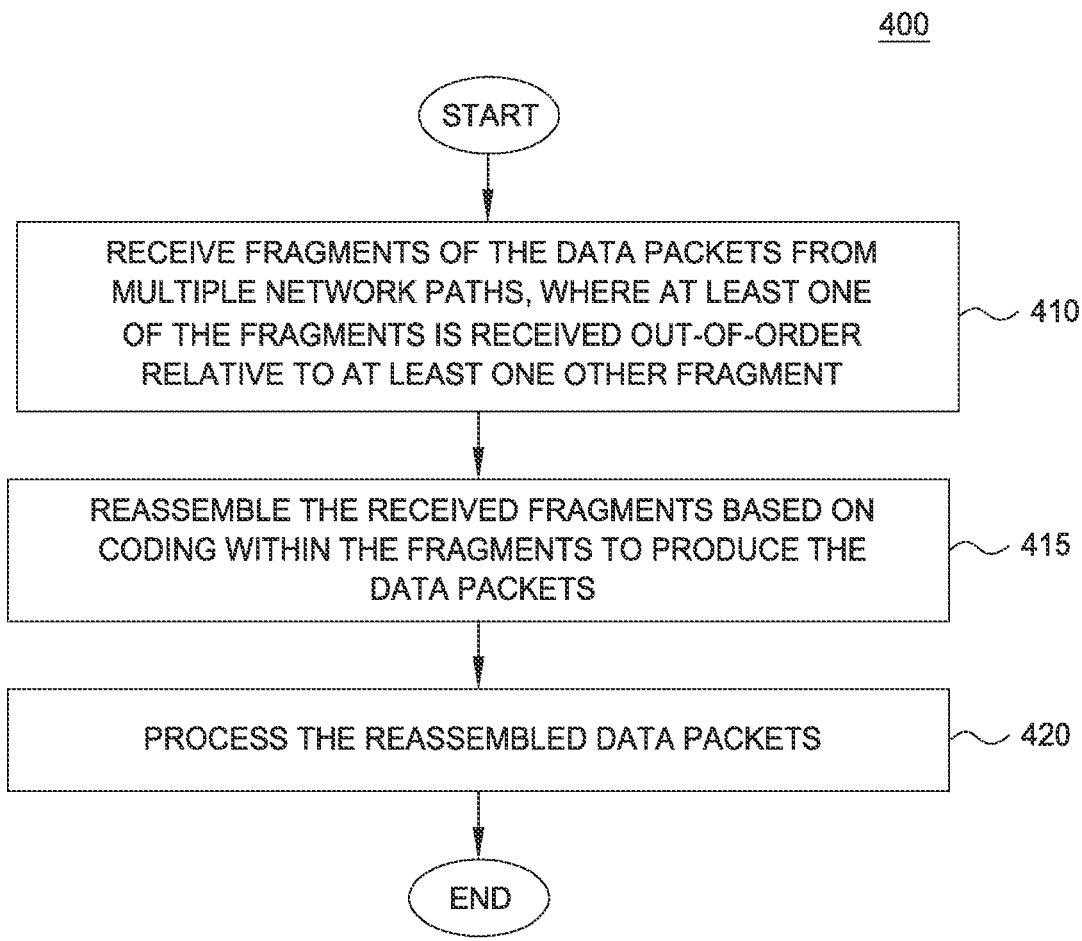
FIG. 4 is a block diagram illustrating a method for reassembling fragmented data packets received on a deterministic Ethernet network, according to one embodiment described herein.

FIG. 4 is a block diagram illustrating a method for reassembling fragmented data packets received on a deterministic Ethernet network, according to one embodiment described herein. As shown, the method 400 begins at block 410, as the packet transmission component 138 at a destination device receives fragments of data packets from multiple paths across a deterministic Ethernet network. In the depicted embodiment, at least one of the fragments is received out-of-order relative to at least one of the other fragments. This ordering could be due to, for example, one of the fragments being transmitted across a shorter network path than another one of the fragments. As another example, a network switch used to forward one of the fragments could be experiencing a higher workload which could delay the transmission of one of fragments, while another fragment transmitted across a different path could be transmitted without any additional delay by a second network switch.

The packet transmission component 138 then reassembles the received fragments using in part the sparse graph coding within at least some of the fragments in order to produce the original data packets (block 415). For example, the packet transmission component 138 could use the encoding within at least some of the fragments in order to generate a missing fragment (e.g., a lost fragment, a delayed fragment, etc.). Generally, the reassembly of the fragments into the data packets is based on the manner in which the data packet was initially fragmented. For example, in an embodiment where the data packets are initially divided into two halves during the fragmentation process, the packet transmission component 138 could reassemble the fragments by appending a first one of the fragments for a data packet onto the second fragment for the data packet. The packet transmission component 138 then processes the reassembled data packets (block 420), and the method ends. As an example, without limitation, a data packet could include a command to be executed by a remote PLC in an industrial automation environment, and one or more applications of the present device could process the data packet by executing the command. More generally, however, any sort of processing can be performed, consistent with the present disclosure.

Figure 5:
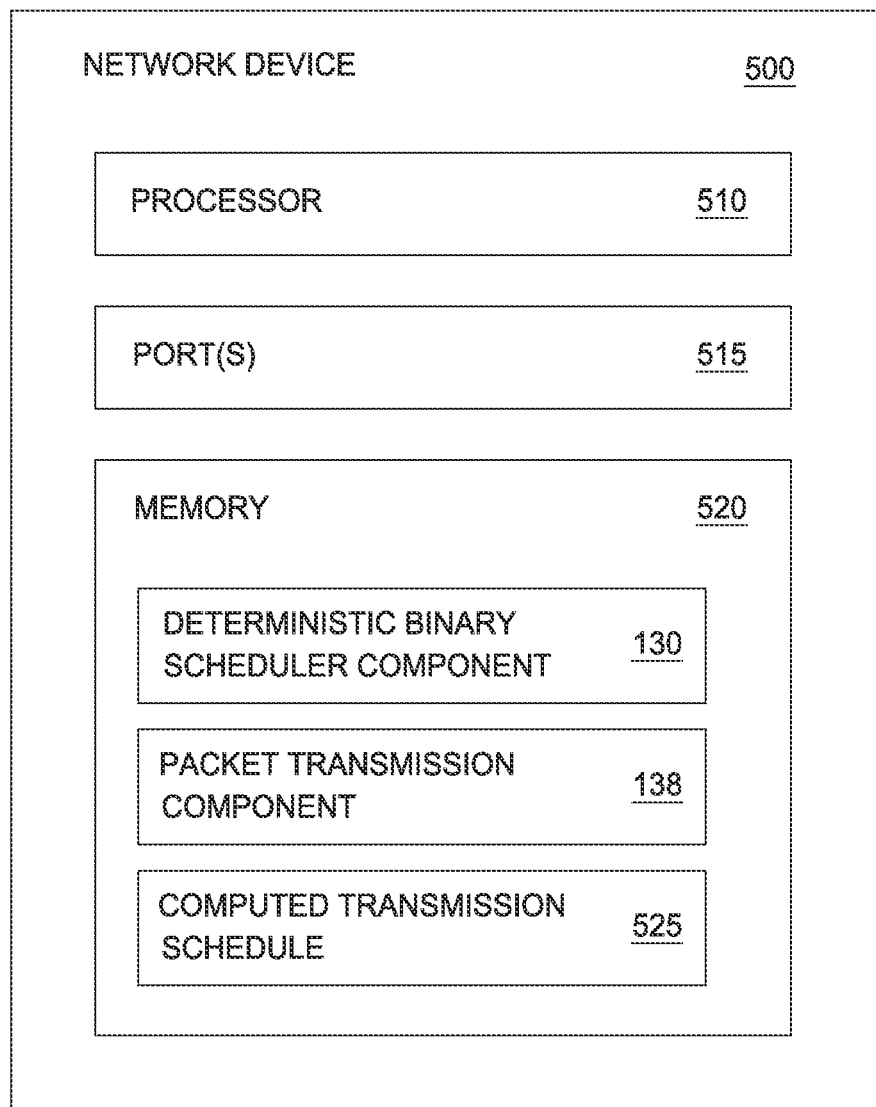
FIG. 5 illustrates a device configured with a deterministic binary scheduler component, according to one embodiment described herein.

FIG. 5 illustrates a device configured with a deterministic binary scheduler component, according to one embodiment described herein. The network device 500 includes a processor 510, port(s) 515 and memory 520. The processor(s) 510 may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

The memory 520 includes the deterministic binary scheduler component 130, packet transmission component 138 and a computed transmission schedule 525. The memory 520 may be either volatile or non-volatile memory and include, RAM, flash, cache, disk drives and the like. Although shown as a single entity, the memory 520 may be divided into different memory storage elements such as RAM and one or more hard disk drives. In one embodiment, the memory 520 comprises one or more static random access memory (SRAM) modules.

Generally, the deterministic binary scheduler component 130 is configured to generate the transmission schedule 525. The transmission schedule 525 generally specifies timing information for transmitting data fragments relating to each of a plurality of data flows on the deterministic Ethernet network, such that all of the respective two or more fragments for each of the data packets arrives at the destination device according to a schedule determined based on the respective period values for the data flows. The deterministic binary scheduler component 130 could then pre-configure each device within the deterministic Ethernet network with a copy of the schedule 525 to facilitate communications between the devices. Of note, while the deterministic binary scheduler component 130 and packet transmission component 138 are shown here as residing on the single network device 500, such an example is for illustrative purposes only and without limitation, and it is broadly contemplated that the deterministic binary scheduler component 130 and packet transmission component 138 can reside on any suitable device (or separate suitable devices), consistent with the present disclosure.

The packet transmission component 138 is generally configured to access a deterministic binary schedule (e.g., schedule 525) specifying timing information for transmitting data fragments relating to a plurality of data flows. The packet transmission component 138 then receives a plurality of data packets to packets to transmit to a destination device within the deterministic Ethernet network. For example, the data packets may be generated by one or more applications running on the network device 500 and/or another device(s). The packet transmission component 138 then fragments each of the data packets into two or more fragments as specified by the transmission schedule 525. For example, the schedule 525 could specify that each data packet should be divided into two fragments.

The packet transmission component 138 further encodes at least one of the two or more fragments for each of the data packets with a respective sparse graph code. In one embodiment, the packet transmission component 138 is configured to combine two or more fragments (e.g., using a union operation), when the schedule 525 specifies that the two or more fragments are to be transmitted together within a single time slot. For example, the packet transmission component 138 could be configured to generate a LDPC or Repeat Accumulate Code for the union of the fragments of all conflicting data flows. Moreover, the packet transmission component 138 could transmit the fragmented flows together with additional fragments that provide checksum information (e.g., check nodes for LDPC) of a subset of the fragments. Doing so allows the destination device to verify the integrity of the received fragments and to reconstruct any lost or delayed data fragments using the sparse graph codes.

The packet transmission component 138 then transmits the encoded fragments to the destination device, across multiple paths through the deterministic Ethernet network, according to timing information specified in the deterministic binary schedule. As discussed above, the packet transmission component 138 may transmit redundant copies of the encoded fragments across multiple paths through the network to help ensure that the destination device will receive at least one of the fragments on time as defined by the schedule 525. Doing so provides a jitter-free, high redundancy deterministic Ethernet communications network.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
receiving, at a first device in a deterministic Ethernet network, a deterministic binary schedule specifying timing information for transmitting data fragments relating to a plurality of data flows;
receiving data packets to transmit to a destination device within the deterministic Ethernet network;
fragmenting each of the data packets into two or more fragments;
encoding, by operation of one or more computer processors, at least one of the two or more fragments for each of the data packets with a respective sparse graph code; and
transmitting the encoded fragments to the destination device, across multiple paths through the deterministic Ethernet network, according to timing information specified in the deterministic binary schedule, comprising:
transmitting a first one of the data fragments at a first moment in time, according to the timing information specified in the deterministic binary schedule; and
transmitting a duplicate copy of the first data fragment at a second moment in time, according to the timing information specified in the deterministic binary schedule, wherein the second moment in time is subsequent to the first moment in time.
2. The method of claim 1, wherein the sparse graph code comprises a low-density parity-check code.
3. The method of claim 1, wherein the destination device, upon receiving the two or more fragments, is configured to reassemble the data packet from the received two or more fragments, wherein the destination device is configured to compute a first fragment using the sparse graph codes, thereby creating zero-jitter scheduling for the transmission of the data packets.

4. The method of claim 3, wherein the destination device is configured to reassemble the data packet using fragments received from different paths through the deterministic Ethernet network.

5. The method of claim 1, wherein each of the plurality of data flows corresponds to a respective period value, and the method further comprising:
generating the deterministic binary schedule specifying the timing information for transmitting data fragments relating to a plurality of data flows, such that all of the respective two or more fragments for each of the data packets arrives at the destination device according to a schedule determined based on the respective period values.

6. The method of claim 5, further comprising:
preloading each network device within the deterministic Ethernet network with the generated deterministic binary schedule,
wherein receiving, at the first device in a deterministic Ethernet network, the deterministic binary schedule further comprises retrieving the deterministic binary schedule from a storage medium accessible by the first device onto which the deterministic binary schedule was preloaded.

7. The method of claim 6, further comprising:
determining an optimal number of multiple paths on which the encoded fragments are to be transmitted, based on an estimated data loss rate for the deterministic Ethernet network, wherein the encoded fragments are transmitted to the destination device across the optimal number of multiple paths through the deterministic Ethernet network.

8. The method of claim 7, wherein the optimal number of multiple paths is determined further based on an estimated time savings value corresponding to transmitting the encoded fragments across an additional path through the deterministic Ethernet network.

9. The method of claim 7, wherein the optimal number of multiple paths is determined further based on an estimated amount of increased bandwidth consumed from transmitting the encoded fragments across an additional path through the deterministic Ethernet network.

10. A network device, comprising:
one or more computer processors;
one or more ports connecting the network device to a deterministic Ethernet network; and
logic for:
receiving, at the network device, a deterministic binary schedule specifying timing information for transmitting data fragments relating to a plurality of data flows;
receiving data packets to transmit to a destination device within the deterministic Ethernet network;
fragmenting each of the data packets into two or more fragments;
encoding, by operation of the one or more computer processors, at least one of the two or more fragments for each of the data packets with a respective sparse graph code; and
transmitting, using the one or more ports, the encoded fragments to the destination device across multiple paths through the deterministic Ethernet network, according to timing information specified in the deterministic binary schedule, comprising:
transmitting a first one of the data fragments at a first moment in time, according to the timing information specified in the deterministic binary schedule; and
transmitting a duplicate copy of the first data fragment at a second moment in time, according to the timing information specified in the deterministic binary schedule, wherein the second moment in time is subsequent to the first moment in time.

11. The network device of claim 10, wherein the sparse graph code comprises a low-density parity-check code.

12. The network device of claim 10, wherein the destination device, upon receiving the two or more fragments, is configured to reassemble the data packet from the received two or more fragments, wherein the destination device is configured to compute a first fragment using the sparse graph codes, thereby creating zero-jitter scheduling for the transmission of the data packets.

13. The network device of claim 12, wherein the destination device is configured to reassemble the data packet using fragments received from different paths through the deterministic Ethernet network.

14. The network device of claim 10, wherein each of the plurality of data flows corresponds to a respective period value, and the network device further comprising logic for:
generating the deterministic binary schedule specifying the timing information for transmitting data fragments relating to a plurality of data flows, such that all of the respective two or more fragments for each of the data packets arrives at the destination device according to a schedule determined based on the respective period values.

15. The network device of claim 14, further comprising logic for:
preloading each network device within the deterministic Ethernet network with the generated deterministic binary schedule,
wherein the logic for receiving, at the first device in a deterministic Ethernet network, the deterministic binary schedule further comprises logic for retrieving the deterministic binary schedule from a storage medium accessible by the first device onto which the deterministic binary schedule was preloaded.

16. The network device of claim 15, further comprising logic for:
determining an optimal number of multiple paths on which the encoded fragments are to be transmitted, based on an estimated data loss rate for the deterministic Ethernet network, wherein the encoded fragments are transmitted to the destination device across the optimal number of multiple paths through the deterministic Ethernet network.

17. The network device of claim 16, wherein the optimal number of multiple paths is determined further based on (i) an estimated time savings value corresponding to transmitting the encoded fragments across an additional path through the deterministic Ethernet network and (ii) an estimated amount of increased bandwidth consumed from transmitting the encoded fragments across an additional path through the deterministic Ethernet network.

18. A non-transitory computer-readable medium storing computer program codes that, when executed, perform an operation for:
receiving, at a first device in a deterministic Ethernet network, a deterministic binary schedule specifying timing information for transmitting data fragments relating to a plurality of data flows;

receiving data packets to transmit to a destination device within the deterministic Ethernet network;

fragmenting each of the data packets into two or more fragments;

encoding at least one of the two or more fragments for each of the data packets with a respective sparse graph code; and transmitting the encoded fragments to the destination device, across multiple paths through the deterministic Ethernet network, according to timing information specified in the deterministic binary schedule, comprising:

transmitting a first one of the data fragments at a first moment in time, according to the timing information specified in the deterministic binary schedule; and transmitting a duplicate copy of the first data fragment at a second moment in time, according to the timing information specified in the deterministic binary schedule, wherein the second moment in time is subsequent to the first moment in time.

* * * * *